US008626833B2

(12) United States Patent
Natsume

(10) Patent No.: US 8,626,833 B2
(45) Date of Patent: Jan. 7, 2014

(54) VEHICLE-MOUNTED COMMUNICATION SYSTEM

(75) Inventor: Akihiro Natsume, Yokkaichi (JP)

(73) Assignees: Autonetworks Technologies, Ltd., Yokkaichi-shi (JP); Sumitomo Wiring Systems, Ltd., Yokkaichi-shi (JP); Sumitomo Electric Industries, Ltd., Osaka (JP)

(*) Notice: Subject to any disclaimer, the term of this patent is extended or adjusted under 35 U.S.C. 154(b) by 1007 days.

(21) Appl. No.: 12/451,472

(22) PCT Filed: Nov. 13, 2008

(86) PCT No.: PCT/JP2008/070660
§ 371 (c)(1),
(2), (4) Date: Nov. 13, 2009

(87) PCT Pub. No.: WO2009/069472
PCT Pub. Date: Jun. 4, 2009

(65) Prior Publication Data
US 2010/0138493 A1 Jun. 3, 2010

(30) Foreign Application Priority Data
Nov. 30, 2007 (JP) ................. 2007-310461

(51) Int. Cl.
*G06F 15/16* (2006.01)
*H04L 12/56* (2011.01)
*H04B 7/212* (2006.01)
*H04L 12/26* (2006.01)
*G05D 1/00* (2006.01)
*G06F 7/00* (2006.01)
*B60R 22/00* (2006.01)

(52) U.S. Cl.
USPC .................. 709/204; 701/1; 701/36; 701/49; 701/48; 370/392; 370/442; 370/235

(58) Field of Classification Search
USPC .............. 709/204; 701/1, 35, 36, 49, 48, 903, 701/180; 370/392, 442, 235, 351, 401
See application file for complete search history.

(56) References Cited

U.S. PATENT DOCUMENTS

2004/0042401 A1* 3/2004 Itoi ............................. 370/235
2006/0171409 A1 8/2006 Date et al.
2009/0213870 A1* 8/2009 Terasawa et al. ............. 370/442

FOREIGN PATENT DOCUMENTS

DE 10 2005 033 830 A1 1/2007
JP A-2001-257679 9/2001
(Continued)

OTHER PUBLICATIONS

International Search Report of Application No. PCT/JP2008/070660, issued Dec. 22, 2008.
(Continued)

Primary Examiner — Backhean Tiv
Assistant Examiner — Alan S Chou
(74) Attorney, Agent, or Firm — Oliff & Berridge, PLC

(57) ABSTRACT

A communication network in which a plurality of terminals are connected to a common bus is a vehicle-mounted communication system which connects a plurality of ECUs though the bus, transmits messages at predetermined communication intervals between the ECUs, and receives the transmitted messages. The messages transmitted/received between the ECUs through a CAN communication line are divided into a plurality of groups such as a first group, a second group to an Nth group according to the type of message information. Each of the ECUs is provided with a transmission timing operation part for computing the transmission timing for each message group to be transmitted. The transmission timing operation part adjusts so as to bring the transmission timing of message belonging to the first group transmitted from its own ECU closer to the transmission timing of message belonging to the first group received from another electronic control unit.

5 Claims, 9 Drawing Sheets

(56) References Cited

FOREIGN PATENT DOCUMENTS

| | | |
|---|---|---|
| JP | A-2006-180205 | 7/2006 |
| JP | A-2006-211585 | 8/2006 |
| JP | A-2007-60400 | 3/2007 |

OTHER PUBLICATIONS

Sep. 21, 2012 Office Action issued in German Patent Application No. 11 2008 003 047.2 (with translation).

\* cited by examiner

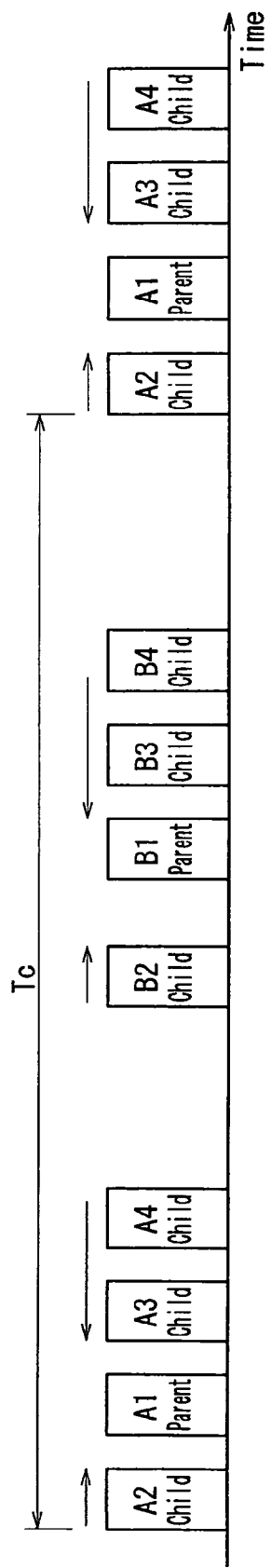

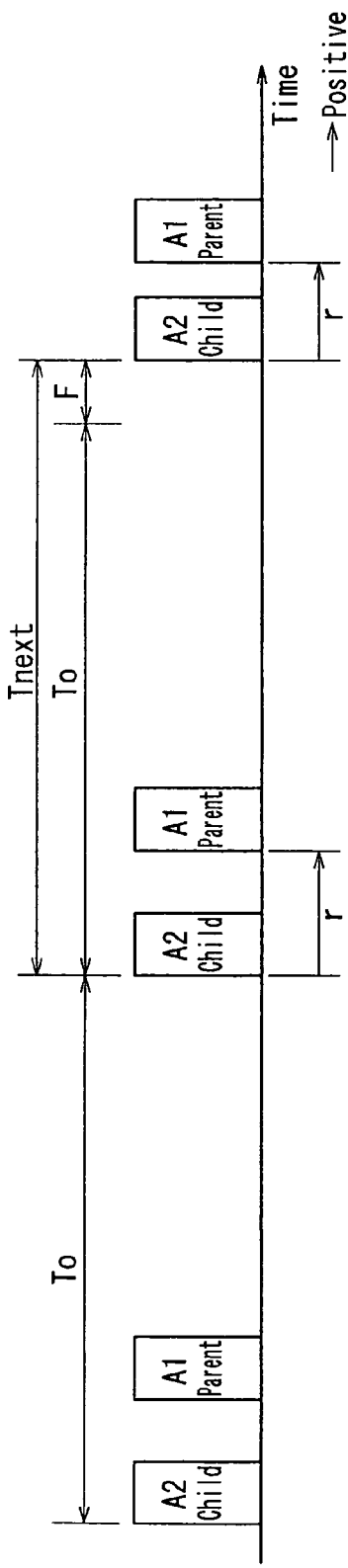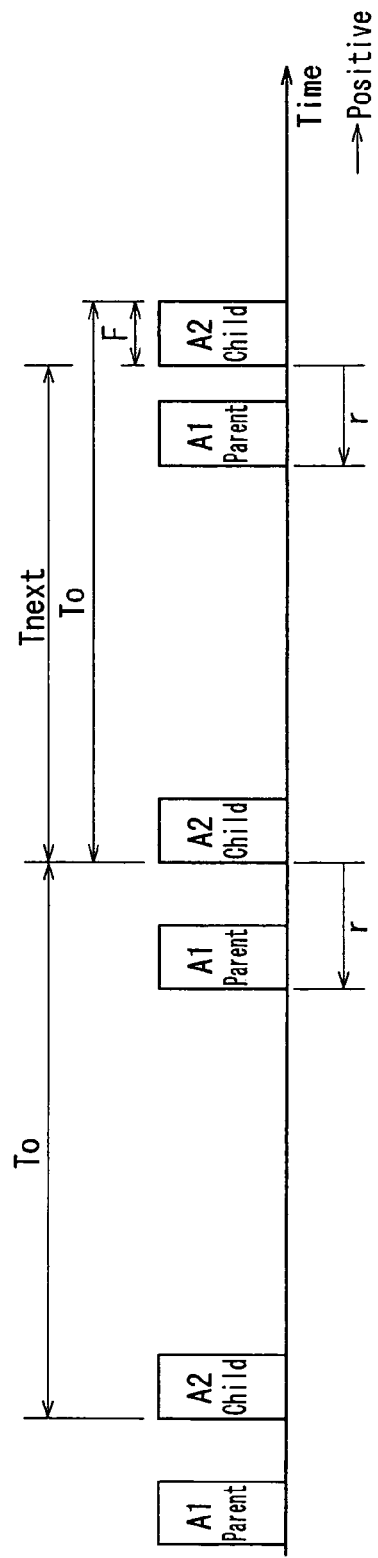

|  | ECU A | ECU B | ECU C |
|---|---|---|---|
| First period | ① 0ms | ② 4ms | ③ 8ms |
| Second period | ⑤ 4ms | skip | ④ 0ms |
| Third period | skip | ⑥ 0ms | ⑦ 4ms |
| Fourth period | ⑧ 0ms | ⑨ 4ms | skip |

|  | ECU A | ECU B | ECU C |
|---|---|---|---|
| First period | ① 0ms | ② 4ms | ③ 8ms |
| Second period | ④ 4ms | ⑤ 8ms | skip |
| Third period | ⑦ 8ms | skip | ⑥ 4ms |

[Prior Art]

VEHICLE-MOUNTED COMMUNICATION SYSTEM

TECHNICAL FIELD

The present invention relates to a communication system to be mounted on a car. More particularly, each ECU adjusts transmission timings of messages by dividing messages into groups to make the transmission timings of messages belonging to the same group close to each other and make the transmission timings of messages belonging to a different group distant from each other.

BACKGROUND ART

Conventionally in a car, there is adopted a communication system, to be mounted on a car, in which messages are sent and received among electronic control units (ECU) by constructing a network in which a plurality of terminals is connected to a common bus. In the network, ECUs controlling the operation of appliances mounted on the car are connected with each other via a bus for multiplex communication.

CAN (Controller Area Network) is widely used as the communication protocol of the communication system to be mounted on a car. The CAN is an asynchronous communication allowing any of the ECUs to send messages when the bus is in an open state.

When messages are simultaneously sent from a plurality of the ECUs, arbitration is executed to allow the transmission of a message having a higher priority to be effective. Therefore there is a case in which a certain amount of time elapses before the ECU having a low priority sends a message.

Therefore in designing the message communication among the ECUs, there occurs a problem that in supposition of the longest delay period of time caused by a defeat in the execution of the arbitration, a load factor to be applied to the bus cannot but be set low.

In the communication system to be mounted on a car, there is a demand for making transmission timings as close as possible in each group by dividing messages into some groups.

Messages are so divided that messages relating to each other fall into the same group. For example, messages relating to a steering system fall into the same group. Upon receipt of a message, sent from one of other ECUs, which belongs to the same group, one ECU sends a message in response. At this time, the transmission timings are made as close as possible in each group, whereas in a different group, transmission timings are made as distant as possible. Thereby delay in response decreases, which allows electric appliances relating to the steering system and the like to be controlled rapidly.

The present applicant proposed the control system for controlling the transmission timings of messages, as described in Japanese Patent Application Laid-Open No. 2007-60400 (patent document 1). In the control system, each of a plurality of the ECUs connected to the bus has the time measuring means. Each ECU measures the transmission timings of messages sent from other ECUs and adjusts the transmission start timings of messages to be sent from each ECU according to values indicated by the time measuring means. Owing to the adjustment, the ECU makes the transmission timings of messages to be sent therefrom later than the transmission finish timings of messages the other ECUs have sent. Thereby collision between the messages sent from other ECUs is prevented.

The method of the patent document 1 is effective in determining the transmission timings of messages to be sent from all ECUs on the basis of one ECU. But the communication system to be mounted on a car has become large, complicated, and many kinds of the communication system to be mounted on a car is in production. When the reference ECU which may be called a time prototype is set, influence is great when the reference ECU has failure. Thus to determine the transmission timing in dependence on the reference ECU has a problem. Considering a case in which the reference ECU is different in dependence on the kind of a car, the method of the patent document 1 tends to increase the kind of the ECU, and there is a possibility that the degree of freedom of mounting the kind of the ECU is impaired.

Even when there is no reference ECU, the method of the patent document 1 is applicable to the communication system to be mounted on a car. But in this case, there is a possibility that the transmission timings of messages ECUs have sent do not become close to each other and fall into an oscillation state. This is shown by using an example of FIG. 13.

For example, in a case where it is desirable for ECUs to send messages at timings as close as possible, an ECU A, an ECU B, and an ECU C are considered. Let it be supposed that an average period of the entire communication system is about 9 ms (msec). Let it be also supposed that of the transmission periods shown in FIG. 13(A), the transmission time of a first period is set as an initial condition and that in periods subsequent to the second period, transmission timings are so set that the ECU A sends a message at the transmission timing of the ECU B of the first period, the ECU B sends a message at the transmission timing of the ECU C of the first period, and the ECU C sends a message at the transmission timing of the ECU A of the first period. At this time, numerical values shown in FIG. 13(A) indicate the transmission order. The transmission timings of the ECUs remain oscillated and do not become close to each other nor converge and in addition even skip-caused missing of messages occurs in the transmission thereof.

Even though the transmission timing is so set that one ECU sends a message to one of other ECUs and thereafter sends a next message thereto after the other ECU sends a message at an initial transmission timing+9 ms, the transmission order is as shown in FIG. 13(B). Similarly to the transmission timing shown in FIG. 13(A), the transmission timings of the messages sent from each of the ECUs remain oscillated and do not become close to each other nor converge and in addition even skip-caused missing of messages occurs in the transmission thereof. Similarly even though an average value of transmission timings of other ECUs is used, failure occurs.

That is, when the reference ECU is not set, there is a case in which the application of the method of the patent document 1 does not allow messages each of the ECUs has sent to become close to each other and to converge. Thus there is room for improvement in the method of the patent document 1.

A method of making transmission timings of messages distant from each other when the messages can be divided into not less than two groups is not disclosed in the patent document 1. A method of outputting messages by spacing transmission timings from each other at constant time lags is described in the patent document 1. This method is incapable of making the transmission timings of two groups distant from each other unless the average period of the entire communication system is known. In addition, in dependence on an operation state, the average period of the entire communication system of a car changes. Thus the method of the patent document 1 is incapable of making the transmission timings of the two groups distant from each other. Therefore there is room for improvement in the method of the patent document 1.

Patent document: Japanese Patent Application Laid-Open No. 2007-60400

DISCLOSURE OF THE INVENTION

Problem to be Solved by the Invention

The present invention has been made in view of the above-described problems. It is an object of the present invention to adjust transmission timings of messages belonging to the same group so that the transmission timings thereof are as close as possible when ECUs send the messages.

It is another object of the present invention to adjust the transmission timings of messages belonging to the same group and those of messages belonging to a different group so that the transmission timings of messages belonging to the same group and the different group are as distant as possible.

Means for Solving the Problem

To solve the above-described problem, the present invention provides a communication system to be mounted on a car having a communication network in which a plurality of terminals is connected to a common bus, a plurality of electronic control units is connected to one another via the bus, and messages are sent among the electronic control units at predetermined transmission intervals and the sent messages are received thereby, wherein the messages sent and received among the electronic control units via the bus are divided into a plurality of groups such as a first group, a second group, ..., and an Nth group in dependence on a kind of message information;

each of the electronic control units has a transmission timing operation part computing transmission timings of messages of each group to be sent; and the transmission timing operation part makes transmission timings of messages, belonging to the same group, which are to be sent from one of the electronic control units closer to transmission timings of messages, belonging to the same group, which are received from the other electronic control units than transmission timings of messages belonging to other groups.

Although the CAN communication line in which the CAN is used as the communication protocol is preferably used in the communication system of the present invention to be mounted on a car, it is possible to use communication lines in which other communication protocols are used.

Messages sent and received among the electronic control units (ECU) are divided into a plurality of groups. Each ECU periodically sends messages at almost equal transmission intervals.

The transmission timing operation part of each ECU receives a message from one of the other ECUs and judges whether the received message belongs to the same group as the group of a message the ECU sends or belongs to a different group.

When the message received from the other ECU belongs to the same group, the transmission timing operation part adjusts the transmission timing of the message the ECU sends next by altering the transmission interval thereof and makes the transmission timing of the message the ECU sends next close to the transmission timing of the message to be received from the other ECU. The transmission timing operation part adjusts the transmission timing not by significantly altering the transmission interval, but by altering the transmission interval to a low extent with the transmission timing operation part keeping almost an equal transmission interval.

By repeating the adjustment of the transmission interval of messages each time the ECU sends a message, the transmission timing of the message the ECU sends becomes closer to the transmission timing of messages, received from the other ECU, which belong to the same group than the transmission timings of messages belonging to the other group.

By adjusting the transmission period of the message each time the transmission timing operation part sends the message, in the entire communication system, it is possible to periodically and collectively send messages belonging to the same group to the CAN communication line.

By making the transmission timings close to each other in each group, it is possible to decrease delay in response to the received message belonging to the same group and rapidly control the operation of electric appliances.

It is preferable that the transmission timing operation part adjusts transmission timings of messages so that transmission timings of messages, belonging to the first group, which are to be sent from one of the electronic control units are closer to transmission timings of messages, belonging to the first group, which are received from the other electronic control units than transmission timings of messages belonging to the second group through the Nth group; and adjusts transmission timings of messages so that the transmission timings of the messages belonging to the first group are distant from the transmission timings of the messages belonging to the second group through the Nth group which are different from the first group.

The transmission timing operation part makes the transmission timing of the message the ECU sends as distant as possible from the transmission timings of the messages belonging to a different group. Thereby it is possible to avoid the message sent from the ECU from colliding with the sent message belonging to the different group and improve a load factor of the bus of the communication system. Messages relating to electric appliances independently operating are divided into different groups. Thereby when the system of one control appliance has failure, messages belonging to the different group are sent at transmission timings distant from each other. Thereby it is possible to prevent communication from being adversely affected.

A parent message and child messages are set in each group;

in sending the child messages belonging to the first group from one of the electronic control units, the transmission timing operation part adjusts transmission timings of messages so that transmission timings of the child messages are close to transmission timings of the parent message, belonging to the first group, which is received from the other electronic control unit; and in sending the parent message belonging to the first group from one of the electronic control units, the transmission timing operation part adjusts transmission timings of message so that transmission timings of the parent message which is to be sent from one of the electronic control units are distant from transmission timings of the parent messages, belonging to the second group through the Nth group which are different from the first group, which are received from the other electronic control units.

When the ECU receives a message from one of the other ECUs before it sends the child message, the transmission timing operation part of the ECU judges whether the received message is the parent message belonging to the same group. When the received message is the parent message belonging to the same group, the transmission timing operation part adjusts the transmission timing of the child message the ECU sends so that the transmission timing of the child message is close to that of the parent message.

Because all the ECUs which send the child messages perform the above-described operation, the transmission timings of the child messages belonging to the same group become close to those of the parent message. Thus messages belonging to the same group can be sent periodically and collectively.

When the received message is the parent message belonging to a group different from the group to which the message of the ECU belongs in sending the parent message from the ECU, the transmission timing operation part adjusts the transmission timing to make the transmission timing of the parent message to be sent from the ECU distant from that of the received parent message.

Owing to the above-described operation performed by the ECUs which send the parent messages belonging to the different groups, it is possible to make the transmission timings of the parent messages belonging to the different groups distant from each other.

As described above, because the transmission timing of the child message becomes close to that of the parent message belonging to the same group as the group to which the child message belongs, the transmission timings of the messages belonging to the same group become close to each other, whereas the transmission timings of the messages belonging to the different groups become distant from each other.

More specifically, the transmission timing operation part sets a next transmission interval Tnext as Tnext=To+F for a closest transmission interval To of the message the ECU sends. That is, the transmission timing operation part adjusts the transmission interval by means of the force F. The force F is expressed as a function of a time lag r between the transmission timing of the message the ECU sends and that of an object message.

When the transmission timings of the child messages belonging to the same group are adjusted, the object message means the parent message, whereas when the transmission timings of the parent messages belonging to the different groups are adjusted, the object message means the parent message belonging to the other group.

The transmission timing operation part sets a time lag between the timing at which the object message is received and the transmission timing of the message the ECU sends as the time lag r between the transmission timing of the message the ECU sends and that of the object message.

At this time, supposing that the time lag r in a case in which the transmission timing of the object message is later than that of the message the transmission timing operation part sends is positive, the force F is so set that when the time lag r is positive, the force F is positive, whereas when the time lag r is negative, the force F is negative. Thereby the transmission timing of the message the transmission timing operation part sends becomes close to that of the object message. A state in which the transmission timing of the message the ECU sends becomes close to that of the object message is expressed as "an attractive force works".

By so setting the force F that when the time lag r is positive, the force F is negative and when the time lag r is negative, the force F is positive, the transmission timing of the message the transmission timing operation part sends becomes distant from that of the object message. A state in which the transmission timing of the message the ECU sends becomes distant from that of the object message is expressed as "a repulsive force works".

Therefore when the message the transmission timing operation part sends is the child message, the transmission timing is so set that the attractive force works on the parent message belonging to the same group, whereas when the message the transmission timing operation part sends is the parent message, the transmission timing is so set that the repulsive force works on the parent message belonging to the different group.

It is possible that the parent message and the child messages are not set in each group;

the transmission timing operation part adjusts transmission timings of messages so that transmission timings of messages, belonging to the first group, which are to be sent from one of the electronic control units are close to transmission timings of all messages, belonging to the first group, which are received from the other electronic control units; and the transmission timing operation part adjusts transmission timings of messages so that the transmission timings of the messages, belonging to the first group, which are to be sent from one of the electronic control units are distant from transmission timings of all messages, belonging to the second group through the Nth group that are different from the first group, which are received from the other electronic control units.

More specifically, when the transmission timing operation part receives messages from other ECUs, it judges whether the received messages belong to the same group and computes the time lag between the transmission timings of the received messages and the transmission timing of the message the transmission timing operation part sends.

After receiving all messages the other ECU has sent, the transmission timing operation part finds an average of time lags between messages belonging to the same group to obtain an average time lag, thus finding the attractive force F from the average time lag. The transmission timing operation part also finds an average of time lags between messages belonging to the different group to obtain an average time lag, thus finding the repulsive force F from the average time lag. The transmission timing operation part computes a next transmission interval from the sum of the attractive force and the repulsive force.

As described above, even though the parent message or the child message is not defined, each ECU is capable of adjusting the transmission timings of messages so that the messages belonging to the same group are sent at transmission timings as close as possible and the messages belonging to the different group are sent at transmission timings as distant as possible.

It is preferable to divide messages into groups according to the kind thereof and preferable that at least one of a message group relating to safety control, a message group relating to car body control, a message group relating to a steering system, and a message group relating to a power train system is included.

Effect of the Invention

As described above, in the communication system of the present invention to be mounted on a car, the transmission timing operation part adjusts the transmission timings of messages which are to be sent from one of the electronic control units. By making the messages belonging to the same group as close as possible, it is possible to rapidly control the operation of electric appliances.

Further by making the messages belonging to the different group distant from each other, it is possible to prevent collision between the messages belonging to the different group and improve the load factor of the bus.

BRIEF DESCRIPTION OF THE DRAWINGS

FIG. 2 shows messages to be sent and received in the communication system to be mounted on a car and periods.

FIG. 3 is an explanatory view of the operation principle of a transmission timing operation part sending a child message, in which 3(A) is a case where a parent message is sent later than the child message, and 3(B) is a case in which the parent message is sent earlier than the child message.

FIG. 13 is an explanatory view of a conventional art.

EXPLANATION OF REFERENCE NUMERALS AND SYMBOLS

10: communication system to be mounted on car
20A1 through 20A4, 20B1 through 20B4: electronic control unit (ECU)
Tnext: transmission interval
To: closest transmission interval
F: force
r: time lag

BEST MODE FOR CARRYING OUT THE INVENTION

The embodiments of the present invention are described below with reference to the drawings.

FIGS. 1 through 11 show the first embodiment of the present invention.

Figure 1:
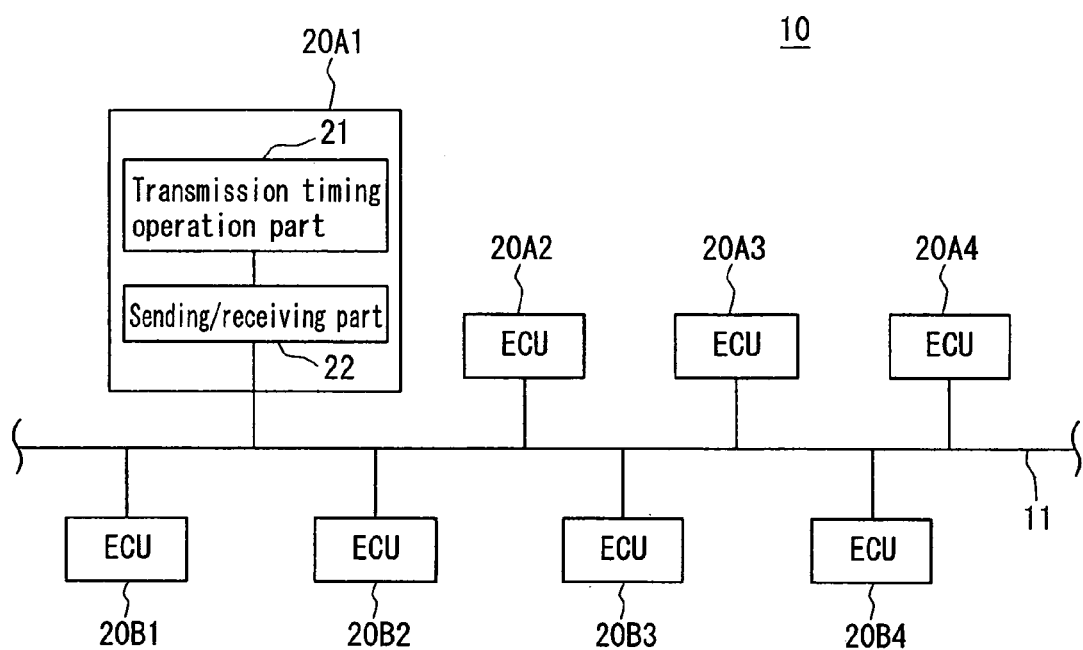
FIG. 1 is a construction view showing a first embodiment of a communication system, of the present invention, to be mounted on a car.

In a communication system 10 of the present invention to be mounted on a car, a plurality of electronic control units (ECU) 20 is connected to a bus 11 so that the ECUs 20 send and receive messages each other. In the first embodiment, as shown in FIG. 1, eight ECUs 20A1 through 20A4 and 20B1 through 20B4 are connected to the bus 11. CAN (controller Area Network) is used as the communication protocol.

Each ECU 20 periodically sends data obtained from a sensor (not shown in the drawings) and the like to the bus as messages and controls loads (not shown in the drawings) such as electric appliances, based on the messages.

Each ECU 20 sends one or a plurality of kinds of messages to the bus. The messages are divided into a plurality of groups. One parent message is set in each group. Other messages of the same group are set as child messages.

To simplify description, in the first embodiment, each of the eight ECUs 20A1 through 20A4 and 20B1 through 20B4 sends only one kind of messages A1 through A4 and B1 through B4. Eight messages to be sent from the eight ECUs 20 are divided into a group A and a group B.

The message A1 the ECU 20A1 sends is set as the parent message of the group A, whereas the messages A2 through A4 the ECU 20A2 through the ECU 20A4 send respectively are set as the child messages of the group A. The message B1 the ECU 20B1 sends is set as the parent message of the group B, whereas the messages B2 through B4 the ECU 20B2 through the ECU 20B4 send respectively are set as the child messages of the group B.

Messages whose transmission timings are desired to be close to each other fall into the same group.

Messages for controlling electric appliances independently operating are divided into different groups. For example, let it be supposed that the messages of the group A relate to an air conditioner and that the messages of the group B relate to interior lighting. When an interior lighting system or an air conditioning system has failure or defect, by sending messages belonging to different groups at transmission timings distant from each other, the messages are prevented from interfering with each other in communication.

Let it be supposed that the messages belonging to the group A relate to the sensor and that the messages belonging to the group B relate to an actuator. When the system is so constructed that the actuator operates and the sensor checks the operation of the actuator, the communication system can be often efficiently operated by temporally making the transmission timing of the message for the sensor and that of the message for the actuator distant from each other.

Each ECU periodically sends messages at appropriate transmission intervals. Unless there are particular conditions, the transmission interval is unconstant. In some cases, the transmission interval changes in dependence on an operation state of each ECU. In some cases where when there is no common clock, the transmission interval changes in dependence on a variation of an internal clock of each ECU. For example, even when the average transmission interval of the ECUs connected to the sensor is 10 ms (msec), in dependence on a state of signals outputted from the sensor, the transmission interval varies in the range of 9 to 11 ms in each transmission.

Messages belonging to the same group are sent from each ECU 20 at approximately equal transmission intervals or at integral multiples of transmission intervals.

As shown in FIG. 2, a period in which the transmissions of the messages A1 through A4 and B1 through B4 are repeated is set as an average period Tc of the entire communication system.

The ECU 20 has a transmission timing operation part 21 and a sending/receiving part 22.

As will be described later in detail, the transmission timing operation part 21 computes and adjusts the transmission timing of a message the ECU 20 sends, namely, an interval Tnext between the time when the ECU 20 sends the message and the time when the ECU 20 sends a next message, thus sending messages at the adjusted transmission timing.

The transmission timing operation part 21 beforehand stores groups to which messages the ECU 20 sends and other ECUs 20 send belong and whether the messages sent therefrom are the parent messages or the child messages. The transmission timing operation part 21 is constructed of a CPU and a program to be executed by the CPU.

The sending/receiving part 22 sends messages to other ECUs 20 and receives messages therefrom via the bus.

FIG. 1 shows the transmission timing operation part 21 and the sending/receiving part 22 of only the ECU 20A1. But all of the ECU 20A2 through ECU 20A4 and the ECU 20B1 through the ECU 20B4 have the same construction.

The principle of the present invention is described below.

As shown in FIG. 2, in the present invention, each ECU 20 adjusts transmission timings of messages so that messages belonging to the same group are sent at transmission timings as close as possible and messages belonging to different groups are sent at transmission timings as distant as possible.

Initially the principle of adjusting the transmission timing of the ECU 20A2 which sends the child message A2 is described below.

Supposing that the parent message is the message A1, the transmission timing operation part 21 adjusts the transmission interval of the child message A2 to make the transmission timings of the child message A2 close to those of the parent message A1 belonging to the same group A.

The transmission timing operation part 21 always monitors the transmission interval of the child message A2. As shown in FIG. 3, supposing that a closest transmission interval between the child messages A2 is To, a next transmission interval Tnext is set as Tnext=To+F. That is, the Tnext is finely adjusted by an amount F called "force".

At this time, as shown in FIG. 3(A), when the parent message A1 is sent later than the child message A2, by setting F as F>0, the transmission interval Tnext is longer than To. Thus the transmission timing of the child message A2 becomes close to the transmission timing of the parent message A1. That is, a time lag r between the transmission timing of the parent message A1 and that of the child message A2 becomes short.

That the parent message A1 is sent later than the child message A2 means that the transmission timing of the parent message A1 temporally lags behind that of the child message A2. That the parent message A1 is sent prior to the child message A2 means that the transmission timing of the parent message A1 is temporally earlier than that of the child message A2.

Comparing the parent message A1 prior to the current parent message by one message with the child message A2 prior to the current child message by one message, as shown in FIG. 3(A), the transmission timing of the parent message A1 is prior to that of the child message A2. By comparing a time lag between the parent message prior to the current parent message A1 by one message and the child message prior to the current child message A2 by one message with a time lag between the parent message of the current parent message A1 and the child message of the current child message A2, a shorter time lag is adopted as the time lag r to be used by the transmission timing operation part 21. The method of adjusting the transmission timing shown in FIGS. 3(B) and 4 are similar to the above-described method.

42 As shown in FIG. 3(B), when the parent message A1 is sent prior to the child message A2, F is set as F<0. Thereby the transmission interval Tnext becomes shorter than To. Therefore the transmission timing of the child message A2 becomes close to the transmission timing of the parent message A1. That is, the time lag r between the parent message A1 and the child message A2 becomes short.

A state in which the other message becomes close to the one message is expressed as "an attractive force works". That is, in the same group, the attraction works on the parent message.

Similarly the ECU 20A3 and the ECU 20A4 adjust the transmission interval of the child message A3 and that of the child message A4 respectively.

By adjusting the next transmission interval of the child message to determine the transmission timing thereof, as described above, the transmission timings of the child messages belonging to the same group become closer to that of the parent message. As shown in FIG. 2, the transmission timings of the messages belonging to the same group become close to each other.

The principle of adjusting the transmission timing of the ECU 20A1 which sends the parent message A1 is described below.

The transmission timing operation part 21 of the ECU 20A1 adjusts the transmission interval of the parent message A1 to make the transmission timings of the parent message A1 distant from those of the parent message B1 belonging to the different group. The closest transmission interval between the parent messages A1 is set to To.

Figure 4A:
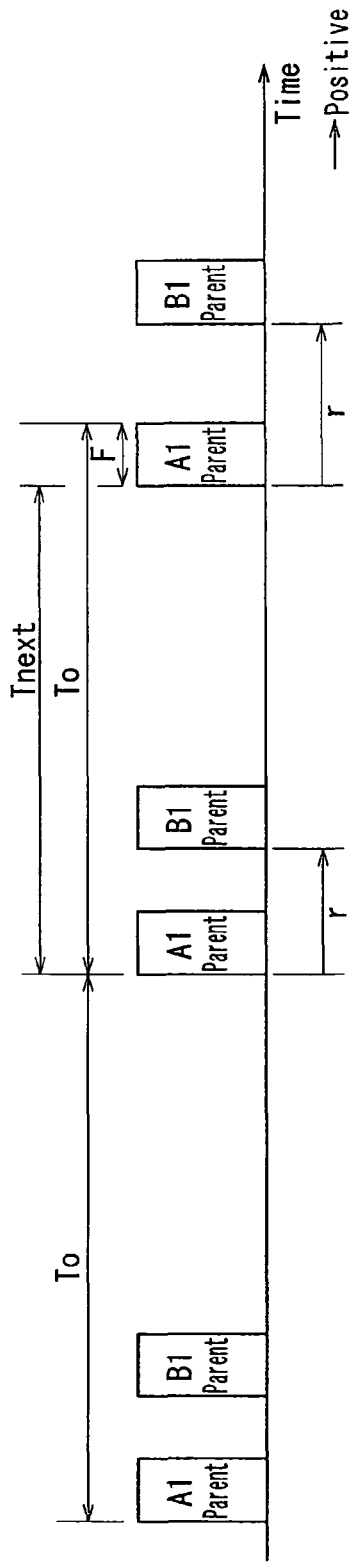
FIG. 4 is an explanatory view of the operation principle of the transmission timing operation part sending a parent message, in which 4(A) is a case where the parent message is sent later than parent messages belonging to a different group, and 4(B) is a case where the parent message is sent earlier than the parent messages belonging to a different group.

As shown in FIG. 4(A), when the parent message B1 is sent later than the parent message A1, by setting F as F<0, the transmission interval Tnext becomes shorter than To. Thus the transmission timing of the parent message A1 is distant from that of the parent message B1. That is, the time lag r between the parent messages A1 and B1 becomes long.

Figure 4B:
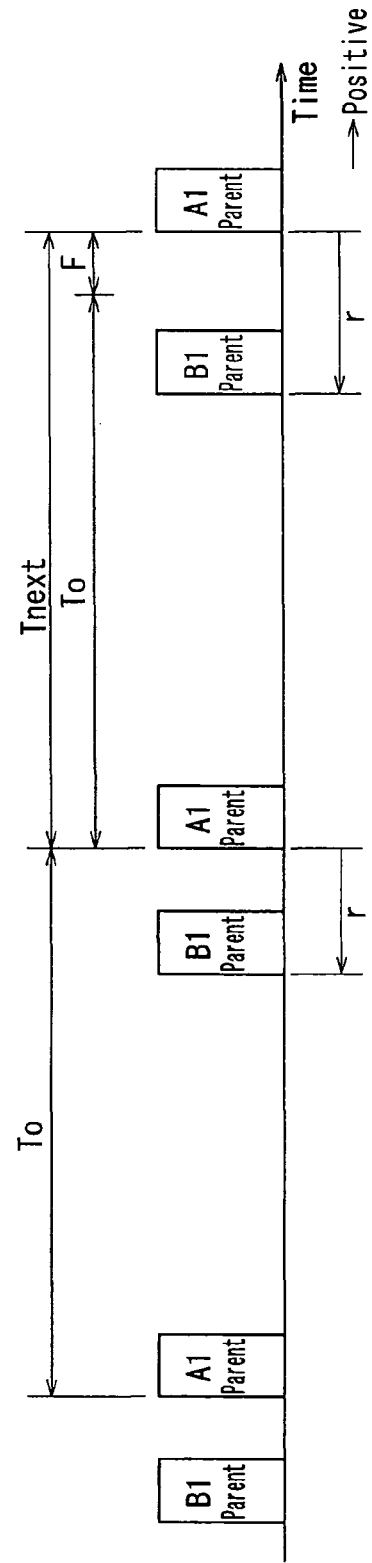

As shown in FIG. 4(B), when the parent message B1 is sent prior to the parent message A1, by setting F as F>0, the transmission interval Tnext becomes longer than To. Thus the transmission timing of the parent message A1 is distant from that of the parent message B1. That is, the time lag r between the parent messages A1 and B1 becomes long.

A state in which the other message becomes distant from the one message is expressed as "a repulsive force works". That is, the repulsive force works on the parent messages A1 and B1 belonging to the different groups.

Similarly the ECU 20B1 adjusts the transmission interval of the parent message B1.

By adjusting the transmission interval between the parent messages belonging to the different groups to determine the transmission timings thereof, as described above, the transmission timings of the parent messages become distant from each other.

The transmission timings of the child messages belonging to the same group become close to that of the parent message, whereas the transmission timings of the parent messages belonging to the different groups become distant from each other, as shown in FIG. 2. Thus the transmission timings of the messages belonging to the same group become close to each other, whereas the transmission timings of the messages belonging to the different groups become distant from each other.

Actually the parent messages B1 are present forward and rearward from the parent message A1. The shorter time lag r between the parent messages A1 and B1 is selected. A case in which the parent messages A1 and B1 are not greatly distant from each other is described with reference to FIG. 4. In a case where the parent messages A1 and B1 are greatly distant from each other, the shorter time lag r between the parent messages A1 and B1 is selected. Therefore the parent messages A1 and B1 become gradually distant from each other and the transmission timings become stable when r≈To/2. The same is true of the child message.

The above-described contents are as described below, when they are generally described.

The next transmission interval Tnext of each message is set as Tnext=To+F for the closest transmission interval To. That is, the transmission interval is finely adjusted by means of the force F.

Regarding the time lag r between the transmission timing of the message the ECU 20 sends and that of an object message (the parent message when the transmission timings of the child messages belonging to the same group are adjusted, and the parent messages of the different groups when the transmission timings of the parent messages belonging to the different groups are adjusted), when the transmission timing of the object message is later than that of the message which is adjusted in the transmission timing thereof, the time lag r is defined as a positive direction lag.

At this time, the force F is the attractive force when the time lag r is positive, the force F is positive, and when the time lag r is negative, the force F is negative. The force F is the repulsive force when the time lag r is positive, the force F is negative, and when the time lag r is negative, the force F is positive.

The force is expressed in the form of F(r) as a function of the time lag r. The force F(r) is selected as follows:

When the time lag r is 0, i.e., when the message to be sent is the same as the object message, the force $F(0)=0$ and no adjustment is made by means of the force F.

In the case where the force F is the attractive force, in the neighborhood of r=0, when r>0, F>0, and when r<0, F<0. In the case where the force F is the repulsive force, when r>0, F<0, and when r<0, F>0. When the absolute value |r| of the time lag r is sufficiently large, the absolute value |F| of the force F attenuates in proportion to the absolute value |r| of the time lag r.

When the time lag r is ±∞ (infinite in positive and negative directions), the force)$F(\pm\infty)=0$.

The force F of each message is set as follows:

The force F of the child messages is so set that the attractive force works on the parent message belonging to the same group.

The force F of parent message is so set that the repulsive force works on the parent message belonging to the different group.

In the first embodiment, the example in which messages are divided into the two groups has been described. When there are not less than three groups, an average of time lags r among a plurality of the parent messages belonging to different groups is found. The force F is computed as the time lag r. Alternatively after forces F which work on a plurality of parent messages belonging to different groups are computed, the sum of the forces is used as the force F.

Figure 5:
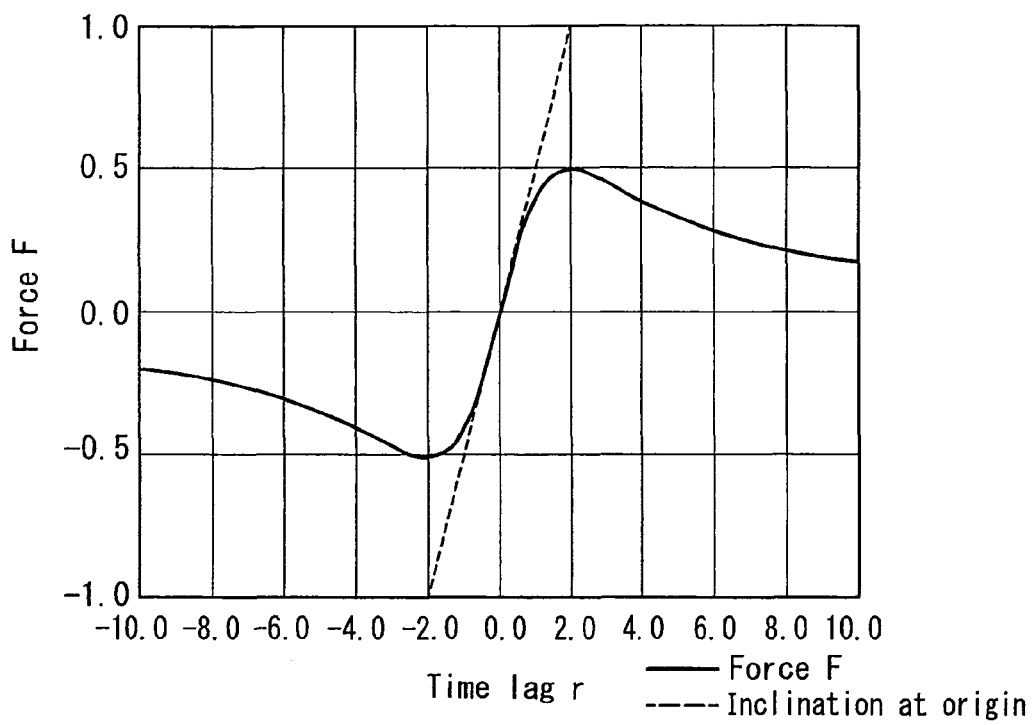
FIG. 5 is an explanatory view showing the relationship between a time lag and a force in which G=1 and g=2.

FIG. 5 is an explanatory view showing an example indicating the relationship between the time lag r and the force F. In the example of FIG. 5, the force $F(r)=2\cdot G\cdot r/(r^2+g^2)$, where G=1 and g=2.

At this time, as described above, when the time lag r is 0, the force $F(0)=0$. In the case where the force F is the attractive force, in the neighborhood of r=0, when r>0, F>0, and when r<0, F<0. When the absolute value |r| of the time lag r is sufficiently large, the absolute value |F| of the force F attenuates in proportion to the absolute value |r| of the time lag r. When the time lag r is ±∞, the force $F(\pm\infty)=0$.

Figure 6:
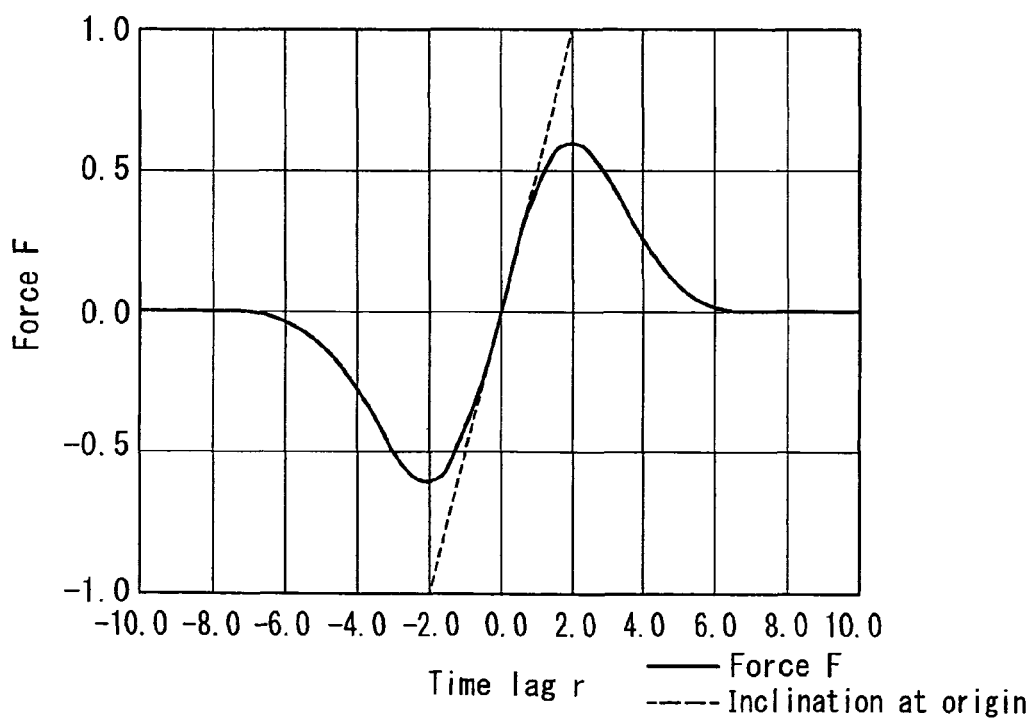
FIG. 6 is an explanatory view showing the relationship between the time lag and the force in which G=2 and g=2.

FIG. 6 shows a case in which the force $F(r)=G\cdot(r/g^2)\cdot \exp(-r^2/(2\cdot g^2))$, where G=2 and g=2.

An operation of adjusting the transmission timing of the ECU 20A2 which sends the child message is described below with reference to the flowchart of FIG. 7.

The transmission timing operation part 21 of the ECU 20A2 periodically sends the message A2 to the bus and computes the transmission period To. FIG. 7 shows an operation of sending the parent message A1 later than the child message A2.

At step S1, the ECU 20A2 receives the parent message A1 the ECU 20A1 has sent.

At step S2, the ECU 20A2 sends the child message A2 via the sending/receiving part 22.

At step S3, the ECU 20A2 receives the parent message A1 the ECU 20A1 has sent. The transmission timing operation part 21 judges whether the received message is the parent message or not and belongs to the same group or not according to an ID (identifier) described on the received message.

At step S4, the transmission timing operation part 21 computes the time lag r from the timing at which the child message A2 has been sent and the timing at which the parent message A1 has been received. As the time lag r, a smaller time lag of a time lag found from a timing observed at step S1 and a time lag found from a timing observed at step S3 is adopted.

At step S5, the transmission timing operation part 21 computes the force F by using the time lag r.

At step S6, the transmission timing operation part 21 computes the next transmission interval Tnext.

The program returns to step S1 at which the next child message A2 is sent after the elapse of the transmission interval Tnext after the transmission timing of the child message A2 sent at step S2.

Figure 7:
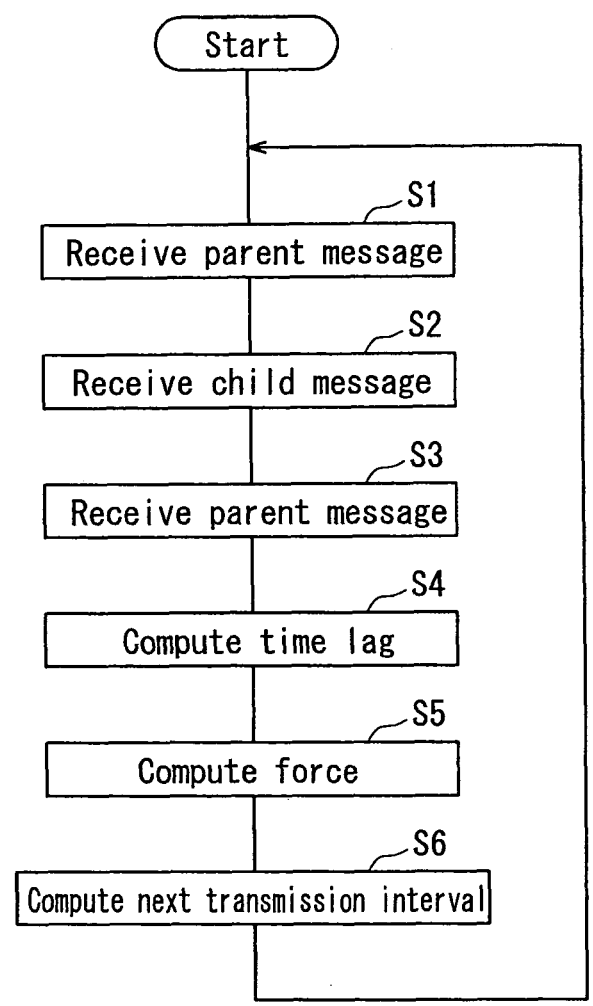
FIG. 7 is a flowchart showing the operation of the transmission timing operation part.

Operations of the other ECUs 20 which send the child messages are similar to the operation shown in FIG. 7.

The ECU 20A1 sends the parent message A1, as shown in FIG. 7. Upon receipt of the parent message B1 the ECU 20B1 has sent, the transmission timing operation part 21 computes the time lag r. The transmission timing operation part 21 computes the next transmission interval Tnext from the time lag r, thus setting the transmission timing of the next parent message A1.

A change of the transmission timing within one period for the number of periods of each group and messages is described below with reference to examples.

EXAMPLE 1

A change of the transmission timing of each message for one period of the entire communication system was simulated.

Messages the eight ECUS 20A1 through 20A4 and 20B1 through 20B4 send were divided into the group A consisting of the messages A1 through A4 and the group B consisting of the messages B1 through B4. The messages A1 and B1 were set as parent messages, whereas the other messages were set as child messages. When the child messages exerted an attractive force on the parent messages respectively and a repulsive force worked on the parent messages belonging to the different groups, the transmission interval of each message was computed by using Tnext=To+F. The force F was set as $F(r)=2\cdot G\cdot r/(r^2+g^2)$. The attractive force=F. The repulsive force=−F, where G=0.02, and g=2.

Based on the transmission interval obtained by the computation, the number of milliseconds that the transmission timing of each message took after a start time of the average period was found.

The number of periods is counted from the time when each ECU 20 starts to send and receive messages. The period means an average period (one period of entire communication system) of the entire communication system 10. The average period means a period in which each ECU 20 sends messages and transmissions of messages are repeated in the entire communication system 10 as in the case of a period Tc of FIG. 2. In the example 1, one period was set to 8 ms.

As an initial value of the transmission timing within one period, the transmission timing of the parent message A1 belonging to the group A was set to 5.0 ms. The transmission timings of the child messages A2, A3, and A4 were set to 2.0 ms, 7.0 ms, and 7.5 ms respectively. The transmission timing of the parent message B1 belonging to the group B was set to 4.0 ms. The transmission timings of the child messages B2, B3, and B4 were set to 3.5 ms, 5.0 ms, and 6.0 ms respectively.

All messages were sent from each ECU once every period Tc.

EXAMPLE 2

Supposing a case in which the transmission timing changes owing to external factors, transmission fluctuation was generated in all messages every period by uniform distribution having a width of 50 μsec.

Other conditions were the same as those of the example 1.

EXAMPLE 3

The constant of the force F was set as G=1 and g=2. Other conditions were similar to those of the example 1.

EXAMPLE 4

The force F was set as $F=G\cdot(r/g^2)\cdot\exp(-r^2/(2\cdot g^2))$. The attractive force=F. The repulsive force=-F. G=0.04, and g=2. Other conditions were similar to those of the example 1.

Figure 8:
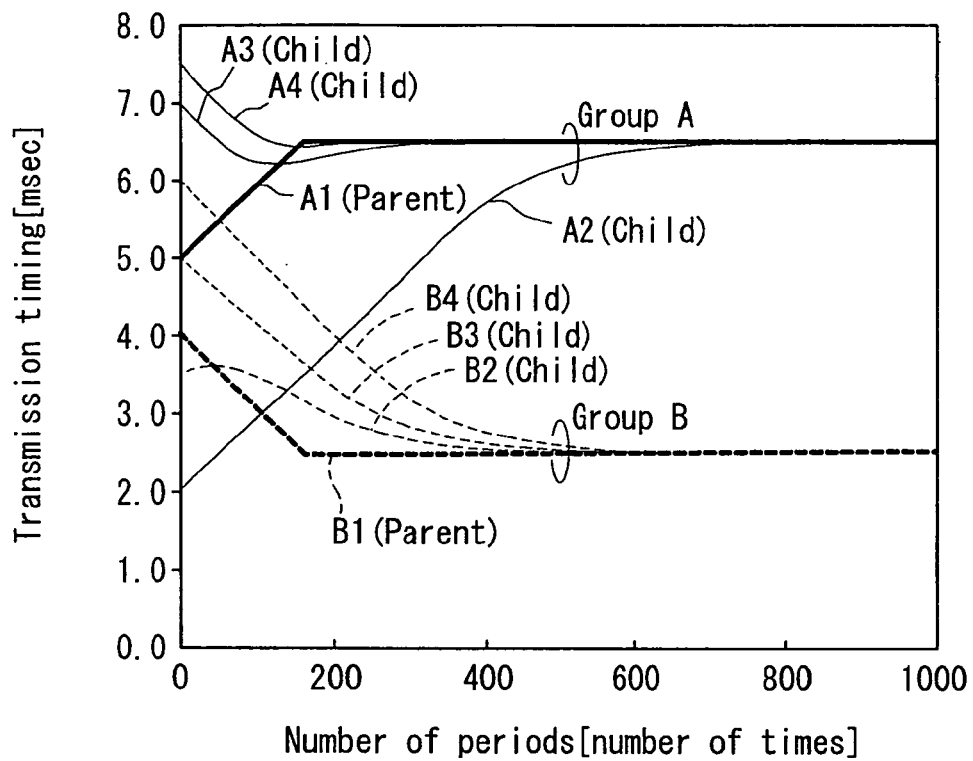
FIG. 8 shows results of computation performed in an example 1.

FIG. 8 shows the result of the computation performed in the example 1. In the present invention, at about 600 periods, the transmission timings of the child messages became almost equal to those of the parent messages, and the transmission timing of the group A and that of the group B were distant from each other.

Figure 9:
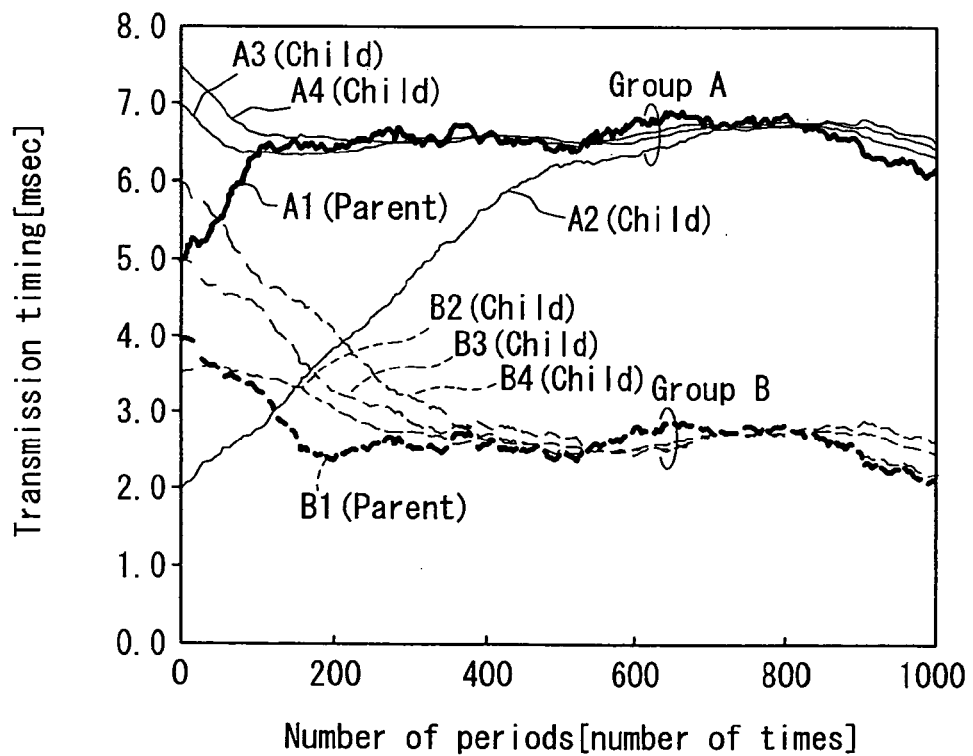
FIG. 9 shows results of computation performed in an example 2.

FIG. 9 shows the result of the computation performed in the example 2. The transmission timing of each message had a stable state with the messages fluctuating without oscillation and divergence. That is, the transmission timing of the child messages became close to those of the parent messages, and the transmission timings of the messages belonging to the different groups became distant from each other.

Figure 10:
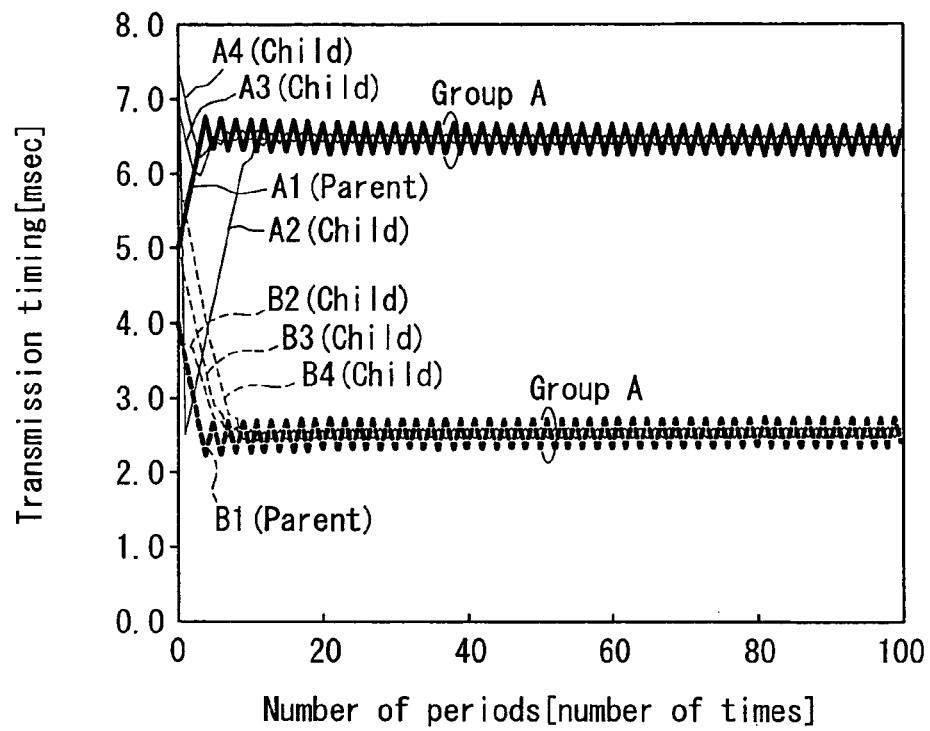
FIG. 10 shows results of computation performed in an example 3.

FIG. 10 shows the result of the computation performed in the example 3. The period of time required for the transmission timing to become stable was as short as about 10 periods.

In FIG. 10, because the force was set large, the transmission timings oscillated, but the oscillation was as small as about 1 ms. Thus when the tolerance of the oscillation is about 1 ms, the value of G=1 and g=2 can be selected.

When the value of G was set larger than that of the example 1, the transmission timings oscillated. Thus when the value of G is set much larger, there is a case in which the oscillation becomes large and is uncontrollable. Because there is a case in which the transmission timings oscillate in dependence on values of the constants G and g of the force F, in using G and g, it is necessary to select constants according to conditions such as the limitation of time till stabilization.

Figure 11:
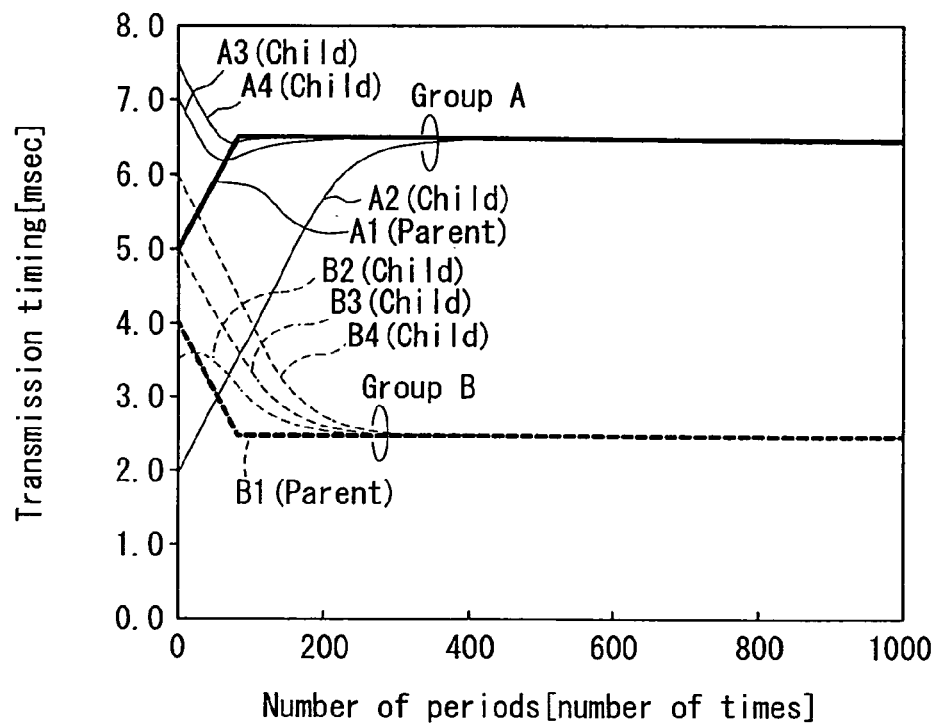
FIG. 11 shows results of computation performed in an example 4.

FIG. 11 shows the result of the computation performed in the example 4. At hundreds of periods, the transmission timings of the child messages became almost equal to those of the parent messages, and messages were sent at constant transmission timings in each group. The equation of the example 4 for finding the force is different from that of the example 1. The period of the example 4 in which the transmission timings of the child messages became almost equal to those of the parent messages were shorter than that of the example 1.

But when the time lag between the transmission timing of the parent message and that of the child message is larger than a certain value, the force does not work and hence there is a case in which an uncontrollable message may appear. In the case of the equation of the force used in the example 4, when the lag is set to two to three times as large as the value of g, as shown in FIG. 6, the force is almost zero. Therefore it is necessary to select the equation used in the example 4 after detecting the entire period (8 ms in example 4).

As described above, in the present invention, each ECU adjusts the transmission timings of messages it sends. It is possible to make messages belonging to the same group as close as possible and make messages belonging to the different group distant from each other. Thus it is possible to rapidly control the operation of electric appliances relating to each other in transmission and reception of messages and avoid collision between messages belonging to the different group and thus improve a load factor of the bus.

In the present invention, each ECU sequentially changes the transmission timings of messages. The basic period is only necessary as an initial value. Thus even though the average period of the entire communication system 10 changes quasi-statically, it is possible to make the transmission timings of messages belonging to the different group distant from one another.

The present invention is applicable when periods of messages are not equal to each other but periods of some messages are integral multiples of periods of other messages. It is possible to exemplify a case in which a closest transmission interval of the message A1 is To=10 ms and a closest transmission interval of the message A2 is To=20 ms.

The above-described method is also applicable to a case in which a message X is desired to be sent at a transmission timing not equal to that of a message Y, but at a transmission timing spaced by 1 ms from that of the message Y, for example. In this case, the ECU 20 which sends messages including the message X may use X+1 ms=X' shifted by 1 ms from the transmission timing of the message X as a virtual transmission timing of the message X. The ECU 20 may apply the present invention to the virtual transmission timing X' so that the transmission timings of the messages become close to each other.

Further by setting all messages of the communication system 10 as parent messages, namely, by exerting the repulsive force among all the messages to make transmission timings distant from each other, it is possible to uniformly distribute the transmission timings of the messages within one period.

The present invention is also applicable to a case in which other ECUs 20 desire to send data at the timing when a message is triggered to each other. Unlike the above-described first embodiment, the same ECU may send messages of a different group, and a different ECU may send messages of the same group.

Figures 12, 13A, 13B:
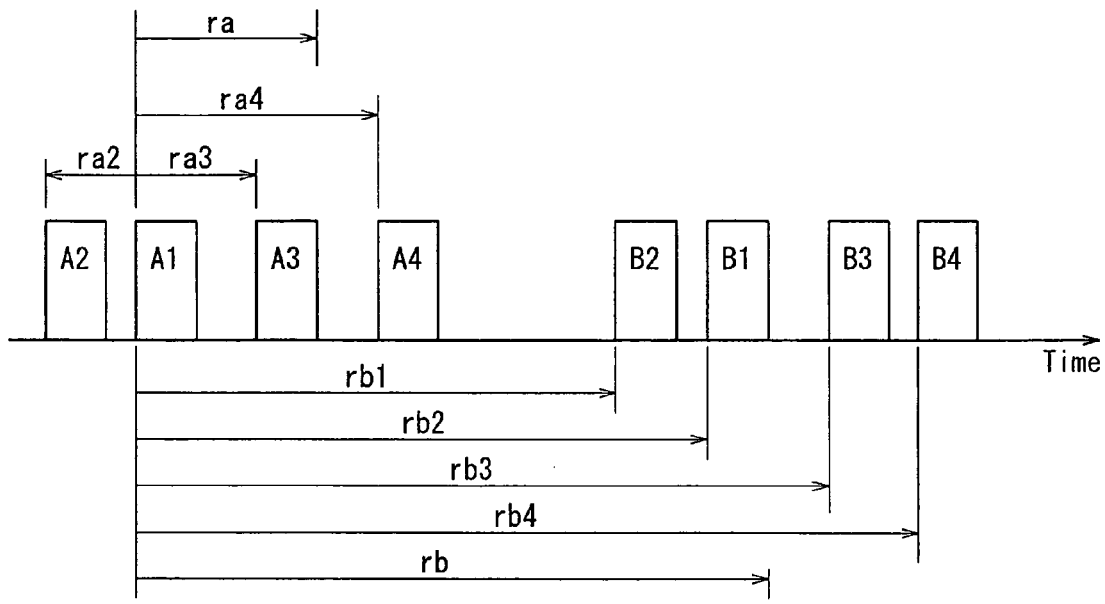
FIG. 12 shows the principle of a second embodiment.

FIG. 12 shows the second embodiment of the present invention.

In the second embodiment, the parent message is not defined in the same group. Each ECU 20 computes the transmission interval Tnext of messages as described below.

The construction of the second embodiment is described below by exemplifying the ECU 20A1 which sends the message A1. Upon receipt of other messages A2 through A4 belonging to the same group, the transmission timing operation part 21 of the ECU 20A1 measures time lags ra2, ra3, and ra4 between the transmission timing of the message A1 and the reception timing of the other messages A2 through A4. Further the transmission timing operation part 21 finds an average of the time lags ra2, ra3, and ra4 to obtain an average time lag ra, thus finding an attractive force F1 by using the average time lag ra.

Thereafter the transmission timing operation part 21 receives messages B1 through B4 of the group B and measures time lags rb1, rb2, rb3, and rb4 between the transmission timing of the message A1 and the reception timing of the messages B1 through B4. Further the transmission timing operation part 21 finds an average of the time lags rb1, rb2, rb3, and rb4 to obtain an average time lag rb. By using the average time lag rb, the transmission timing operation part 21 finds a repulsive force F2.

The transmission timing operation part 21 sets the sum of the attractive force F1+the repulsive force F2 as a force to be used in the computation of the next transmission interval Tnext.

In the above-described construction, even though the parent message is not defined in each group, the ECUs 20 are capable of adjusting the transmission timings of messages so that messages belonging to the same group are sent at transmission timings as close as possible and messages belonging to the different group are sent at transmission timings as distant as possible.

Other ECUs 20 are capable of adjusting the transmission timings of messages by performing similar operations.

The transmission timing operation part 21 may find the attractive force and the repulsive force between the ECUs 20 from the time lag between the transmission timing of a message and those of other messages without finding the average time lags ra, rb and use the sum of these forces as a force to be used to compute the next transmission interval Tnext.

For example, the transmission interval of the message A1 is so set that attractive forces (FA2, FA3, and FA4) are applied to other messages A2 through A4 belonging to the same group A and that repulsive forces (FB1, FB2, FB3, FB4) are applied to messages B1 through B4 belonging to the other group B. After each force is computed, the sum (FA2+FA3+FA4+ FB1+FB2+FB3+FB4) of all the forces is set as the force F applied to the message A1.

It is possible that a case in which the transmission interval Tnext is computed from the average time lag of the second embodiment for each message and a case in which forces are found from respective time lags between a message and other messages and the transmission interval Tnext is computed from the sum of the forces may be mixedly present. Further a group in which the parent message is defined and a group in which the parent message is not defined may be mixedly present.

Because other constructions and the operation and effect of the second embodiment are similar to those of the first embodiment, the same parts of the second embodiment as those of the first embodiment are denoted by the same reference numerals and symbols as those of the first embodiment, and description thereof is omitted herein.

What is claimed is:

1. A communication system to be mounted on a car having a communication network in which a plurality of terminals is connected to a common bus, a plurality of electronic control units is connected to one another via said bus, and messages are sent among said electronic control units at predetermined transmission intervals and said sent messages are received thereby, wherein said messages sent and received among said electronic control units via said bus are divided into a plurality of groups such as a first group, a second group, . . . and an Nth group in dependence on a kind of message information;

each of said electronic control units has a transmission timing operation part computing transmission timings of messages of each group to be sent; and said transmission timing operation part decreases a difference between (i) transmission timings of messages, belonging to the same group, which are to be sent from one of said electronic control units and (ii) transmission timings of messages, belonging to the same group, which are received from said other electronic control units;

said parent message and said child messages are not set in each group;

said transmission timing operation part adjusts transmission timings of messages so that the difference between transmission timings of messages, belonging to the same group, which are to be sent from one of said electronic control units and transmission timings of all messages, belonging to the same group, which are received from said other electronic control units is decreased; and said transmission timing operation part adjusts transmission timings of messages so that a difference between said transmission timings of said messages belonging to said other groups is increased.

2. The communication system to be mounted on a car according to claim 1, wherein said common bus is constructed of a CAN communication line.

3. A communication system to be mounted on a car having a communication network in which a plurality of terminals is connected to a common bus, a plurality of electronic control units is connected to one another via said bus, and messages are sent among said electronic control units at predetermined transmission intervals and said sent messages are received thereby, wherein said messages sent and received among said electronic control units via said bus are divided into a plurality of groups such as a first group, a second group, . . . and an Nth group in dependence on a kind of message information;

each of said electronic control units has a transmission timing operation part computing transmission timings of messages of each group to be sent;

said transmission timing operation part decreases a difference between (i) transmission timings of messages, belonging to the same group, which are to be sent from one of said electronic control units and (ii) transmission timings of messages, belonging to the same group, which are received from said other electronic control units;

a parent message and child messages are set in each group;

in sending said child messages belonging to said first group from one of said electronic control units, said transmission timing operation part adjusts transmission timings of messages so that the difference between transmission timings of said child messages and transmission timings of said parent message, belonging to said first group, which is received from said other electronic control unit is decreased; and in sending said parent message belonging to said first group from one of said electronic control units, said transmission timing operation part adjusts transmission timings of messages so that a difference between transmission timings of said parent message which is to be sent from one of said electronic control units and transmission timings of said parent messages, belonging to said second group through said Nth group that are different from said first group, which are received from said other electronic control units is increased.

4. A communication system to be mounted on a car having a communication network in which a plurality of terminals is connected to a common bus, a plurality of electronic control units is connected to one another via said bus, and messages are sent among said electronic control units at predetermined transmission intervals and said sent messages are received thereby, wherein said messages sent and received among said electronic control units via said bus are divided into a plurality of groups such as a first group, a second group, . . . and an Nth group in dependence on a kind of message information;

each of said electronic control units has a transmission timing operation part computing transmission timings of messages of each group to be sent;

said transmission timing operation part decreases a difference between (i) transmission timings of messages, belonging to the same group, which are to be sent from one of said electronic control units and (ii) transmission timings of messages, belonging to the same group, which are received from said other electronic control units;

said transmission timing operation part adjusts transmission timings of messages so that the difference between transmission timings of messages, belonging to said first group, which are to be sent from one of said electronic control units and transmission timings of messages, belonging to said first group, which are received from said other electronic control units is decreased as compared to a difference between transmission timings of messages, belonging to said first group. which are to be sent from one of said electronic control units and transmission timings of messages belonging to said second group through said Nth group;

adjusts transmission timings of messages so that a difference between said transmission timings of said messages belonging to said first group and said transmission timings of said messages belonging to said second group through said Nth group which are different from said first group is increased;

a parent message and child messages are set in each group;

in sending said child messages belonging to said first group from one of said electronic control units, said transmission timing operation part adjusts transmission timings of messages so that a difference between transmission timings of said child messages and transmission timings of said parent message, belonging to said first group, which is received from said other electronic control unit is decreased; and in sending said parent message belonging to said first group from one of said electronic control units, said transmission timing operation part adjusts transmission timings of messages so that a difference between transmission timings of said parent message which is to be sent from one of said electronic control units and transmission timings of said parent messages, belonging to said second group through said Nth group that are different from said first group, which are received from said other electronic control units is increased.

5. A communication system to be mounted on a car having a communication network in which a plurality of terminals is connected to a common bus, a plurality of electronic control units is connected to one another via said bus, and messages are sent among said electronic control units at predetermined transmission intervals and said sent messages are received thereby, wherein said messages sent and received among said electronic control units via said bus are divided into a plurality of groups such as a first group, a second group, . . . and an Nth group in dependence on a kind of message information;

each of said electronic control units has a transmission timing operation part computing transmission timings of messages of each group to be sent;

said transmission timing operation part decreases a difference between (i) transmission timings of messages, belonging to the same group, which are to be sent from one of said electronic control units and (ii) transmission timings of messages, belonging to the same group, which are received from said other electronic control units;

said transmission timing operation part adjusts transmission timings of messages so that the difference between transmission timings of messages, belonging to said first group, which are to be sent from one of said electronic control units and transmission timings of messages, belonging to said first group, which are received from said other electronic control units is decreased as compared to a difference between transmission timings of messages. belonging to said first group, which are to be sent from one of said electronic control units and transmission timings of messages belonging to said second group through said Nth group;

adjusts transmission timings of messages so that a difference between said transmission timings of said messages belonging to said first group and said transmission timings of said messages belonging to said second group through said Nth group which are different from said first group is increased;

said parent message and said child messages are not set in each group;

said transmission timing operation part adjusts transmission timings of messages so that a difference between transmission timings of messages, belonging to the same group, which are to be sent from one of said electronic control units and transmission timings of all messages, belonging to the same group, which are received from said other electronic control units is decreased as compared to a difference between transmission timings of messages, belonging to the same group, which are to be sent from one of said electronic control units and transmission timings of messages belonging to said other groups; and said transmission timing operation part adjusts transmission timings of messages so that a difference between said transmission timings of said messages belonging to said other groups is increased.

* * * * *